United States Patent [19]

Sommer et al.

[11] 3,945,992

[45] Mar. 23, 1976

[54] ARYLSULPHONYLAMINOSULPHONYLPHENYL-AZO-ARYLENE-AZO-PHENYL DYESTUFF

[75] Inventors: Richard Sommer, Leverkusen; Gerhard Wolfrum, Bergisch-Neukirchen, both of Germany

[73] Assignee: Bayer Aktiengesellschaft, Leverkusen, Germany

[22] Filed: Feb. 22, 1974

[21] Appl. No.: 445,296

[30] Foreign Application Priority Data

Feb. 22, 1973 Germany............................ 2308723

[52] U.S. Cl. ............... 260/174; 260/177; 260/184; 260/185; 260/186; 260/191; 260/196; 260/205; 260/206; 260/208; 260/556 SN
[51] Int. Cl.². C09B 43/18; C09B 31/06; D06P 3/24
[58] Field of Search ........... 260/174, 186, 191, 177, 260/184, 185

[56] References Cited
UNITED STATES PATENTS

| | | | |
|---|---|---|---|
| 2,180,246 | 11/1939 | Krebser............................ | 260/191 |
| 2,317,387 | 4/1943 | Kvalnes et al. ..................... | 260/160 |
| 3,134,766 | 5/1964 | Merian et al. ...................... | 260/186 |
| 3,267,089 | 8/1966 | Feeman ............................ | 260/191 |
| 3,310,550 | 3/1967 | Liechti............................. | 260/152 |
| 3,485,814 | 12/1969 | Speck ............................. | 260/186 |
| 3,725,384 | 4/1973 | Zickendraht et al. ............... | 260/186 |

Primary Examiner—Floyd D. Higel
Attorney, Agent, or Firm—Plumley and Tyner

[57] ABSTRACT

Dyestuffs of the formula

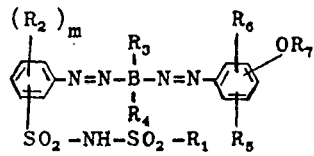

in which
$R_1$ represents an aromatic radical, an aliphatic radical with 1–4 C atoms or a dialkylamino radical in which the alkyl groups contain 1–4 C atoms,
$R_2$ represents chlorine, bromine, an alkoxy group or an alkyl group,
$R_3$ and $R_4$ represent hydrogen, chlorine, bromine, an alkoxy group or an alkyl group,
$R_5$ represents hydrogen, chlorine, bromine, fluorine, a phenyl group, an alkyl group with 1–4 C atoms or an alkoxy group with 1–4 C atoms,
$R_6$ represents hydrogen, an alkyl group with 1–4 C atoms or an alkoxy group with 1–4 C atoms,
$R_7$ represents an arylsulphonyl radical,
B represents a 1,4-phenylene, a 1,4-naphthylene or a tetrahydro-1,4-naphthylene radical and
$m$ represents a number from 0 to 2,
are suitable for dyeing synthetic fibre materials, especially polyamide fibre materials.

5 Claims, No Drawings

ARYLSULPHONYLAMINOSULPHONYLPHENYL-AZO-ARYLENE-AZO-PHENYL DYESTUFF

The present invention relates to new, valuable disazo dyestuffs which in the form of the free acid correspond to the general formula

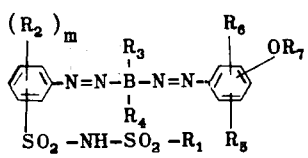

(I)

and to their preparation and use for dyeing synthetic fibre materials, especially polyamide fibre materials.

In the general formula (I)

$R_1$ represents an aromatic radical, an aliphatic radical with 1–4 C atoms or a dialkylamino radical in which the alkyl groups contain 1–4 C atoms, $R_2$ represents chlorine, bromine, an alkoxy group or an alkyl group, $R_3$ and $R_4$ represent hydrogen, chlorine, bromine, an alkoxy group or an alkyl group, $R_5$ represents hydrogen, chlorine, bromine, fluorine, a phenyl group, an alkyl group with 1–4 C atoms or an alkoxy group with 1–4 C atoms, $R_6$ represents hydrogen, an alkyl group with 1–4 C atoms or an alkoxy group with 1–4 C atoms, $R_7$ represents an arylsulphonyl radical, B represents a 1,4-phenylene, a 1,4-naphthylene or a tetrahydro-1,4-naphthylene radical and m represents a number from 0 to 2.

Examples of suitable radicals B are radicals of the formulae

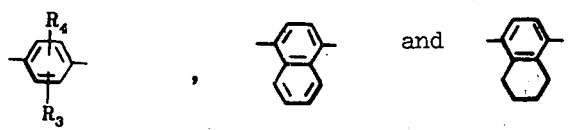

wherein $R_3$ and $R_4$ have the abovementioned meaning.

Preferred alkyl groups are those with 1–4 C atoms. The alkyl and alkoxy groups can be substituted further, for example, by halogen, nitrile, hydroxyl or optionally substituted phenyl. Examples of suitable alkyl groups are $-CH_3$, $-C_2H_5$, $-C_3H_7$, $-C_4H_9$, $-C_2H_4CN$, $-CH_2-C_6H_5$ and $CF_3$.

Preferred alkoxy groups are those with 1–4 C atoms. Suitable alkoxy groups are, for example, $-OCH_3$, $-OC_2H_5$, $-OC_3H_7$, $-OC_4H_9$, $-OCH_2CH_2OH$ and $-OCH_2C_6H_5$.

Examples of suitable dialkylamino radicals $R_1$ are dimethylamino, diethylamino and dibutylamino.

Suitable aromatic radicals $R_1$ are, in particular, phenyl radicals. The phenyl radicals can contain further substituents, for example $C_1-C_4$-alkyl groups, $C_1-C_4$-alkoxy groups, halogen, nitrile, nitro and the like. Phenyl and tolyl are preferred. Further suitable aromatic radicals $R_1$ are 1- and 2-naphthyl radicals. The aliphatic radicals $R_1$ are, in particular, alkyl radicals.

Examples of suitable arylsulphonyl radicals are phenylsulphonyl, naphthylsulphonyl or tetrahydronapthylsulphonyl radicals which can optionally be substituted further, for example by halogen, such as chlorine and bromine, or by methyl, ethyl, methoxy or nitro groups.

Examples of preferred arylsulphonyl radicals are phenylsulphonyl, o-, m- and p-tolylsulphonyl and o-, m- and p-chlorophenylsulphonyl.

The disulphimide group of the formula (I) is in the ortho-, meta- or para-position to the azo bridge and the radical $OR_7$ is in the ortho- or para-position to the azo bridge.

Preferred dyestuffs are those of the formula

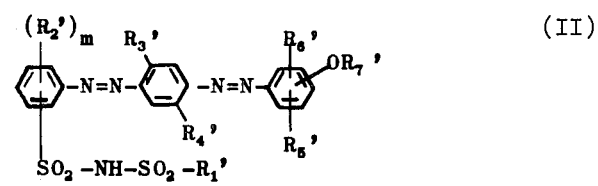

(II)

wherein $R_1'$ represents an aromatic radical or an aliphatic radical with 1–4 carbon atoms, $R_2'$ represents chlorine, bromine, a methoxy or ethoxy group or a methyl or ethyl group, $R_3'$ represents hydrogen, chlorine, a methyl or methoxy group or an ethyl or ethoxy group, $R_4'$ represents hydrogen, a methyl or methoxy group or an ethyl or ethoxy group, $R_5'$ and $R_6'$ independently of one another represent hydrogen, an alkyl group with 1–4 C atoms or an alkoxy group with 1–4 C atoms, $R_7'$ represents a phenylsulphonyl, o-, m- or p-tolylsulphonyl or o-, m- or p-chlorophenylsulphonyl group and m represents a number from 0 to 2, as well as those of the formula

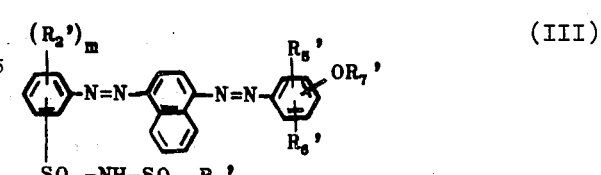

(III)

wherein $R_1'$, $R_2'$, $R_5'$, $R_6'$, $R_7'$ and m have the abovementioned meaning.

Further preferred dyestuffs are those of the formula

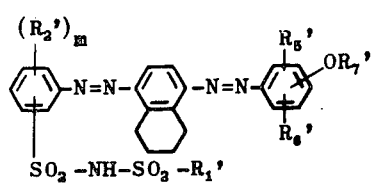 (IV)

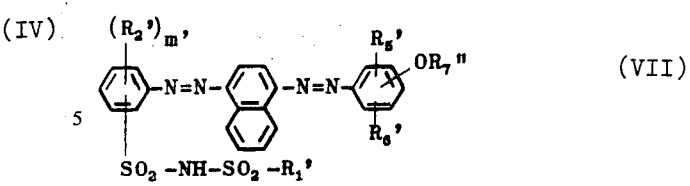 (VII)

wherein
$R_1'$, $R_2'$, $R_5'$, $R_6'$, $R_7'$ and m have the abovementioned meaning.

Particularly valuable dyestuffs are those of the formula wherein
$R_1'$, $R_2'$, $R_5'$, $R_6'$, $R_7''$ and $m'$ have the abovementioned meaning, especially those of the formula

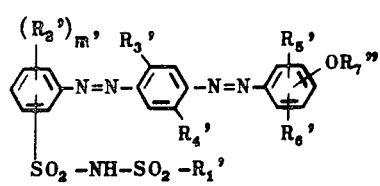 (V)

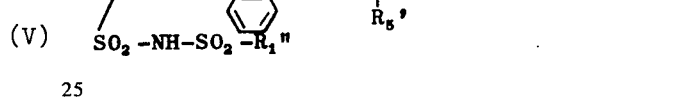 (VIII)

wherein
$R_1'$, $R_2'$, $R_3'$, $R_4'$, $R_5'$ and $R_6'$ have the abovementioned meaning,
$R_7''$ represents phenylsulphonyl or p-tolylsulphonyl and
$m'$ represents 0 or 1 especially those of the formula wherein
$R_2'$, $R_5'$, $R_6'$, $R_7''$ and $m'$ have the abovementioned meaning and
$R_1''$ represents an optionally substituted phenyl radical.

The dyestuffs of the formula (I) are prepared in a known manner, in which amines of the formula

 (IX)

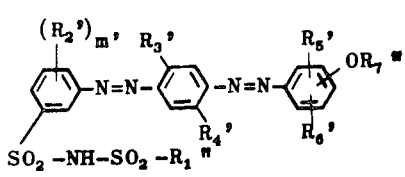 (VI)

wherein
$R_1$, $R_2$ and m have the abovementioned meaning are diazotised and reacted with amines of the formula

 (X)

wherein
$R_2'$, $R_3'$, $R_4'$, $R_5'$, $R_6'$, $R_7''$ and $m'$ have the abovementioned meaning and
$R_1''$ represents an optionally substituted phenyl radical.

Further particularly valuable dyestuffs are those of the formula wherein
$R_3$, $R_4$ and B have the abovementioned meaning and
Z represents H, —SO$_3$H or —CH$_2$SO$_3$H, to give monoazo dyestuffs of the formula

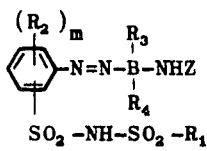

(XI), the monoazo dyestuffs thus obtained are diazotised, after splitting off the group Z, where necessary, by alkaline or acid saponification, the diazotised compound is coupled with phenols which couple in the ortho-position or para-position to the OH group, of the formula

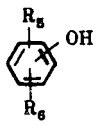

(XII)

wherein $R_5$ and $R_6$ have the abovementioned meaning and thereafter the disazo dyestuffs of the formula

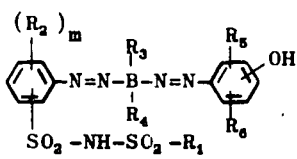

(XIII)

are esterified with arylsulphonyl halides, preferably the chlorides.

As examples of suitable disulphimides of the formula (IX) there may be mentioned (3-amino-benzenesulphonyl)-benzenesulphonamide, (3-amino-4-chloro-benzenesulphonyl)-benzenesulphonamide, (3-amino-benzenesulphonyl)-methanesulphonamide, (3-amino-benzenesulphonyl)-propanesulphonamide, (3-amino-benzenesulphonyl)-butanesulphonamide, (3-amino-benzenesulphonyl)-p-toluenesulphonamide, (3-amino-benzenesulphonyl)-o-toluenesulphonamide, (3-amino-4-chloro-benzenesulphonyl)-p-toluenesulphonamide, (3-amino-4-chloro-benzenesulphonyl)-methanesulphonamide, (3-amino-4-chloro-benzenesulphonyl)-butanesulphonamide, (3-amino-4-chloro-benzenesulphonyl)-o-toluenesulphonamide, (3-amino-6-methyl-benzenesulphonyl)-benzenesulphonamide, (3-amino-6-methyl-benzenesulphonyl)-butanesulphonamide, (3-amino-6-methyl-benzenesulphonyl)-methanesulphonamide, (3-amino-6-methyl-benzenesulphonyl)-p-toluenesulphonamide, (3-amino-6-methyl-benzenesulphonyl)-o-toluenesulphonamide, (3-amino-4-methyl-benzenesulphonyl)-benzenesulphonamide, (3-amino-4-methyl-benzenesulphonyl)-p-toluenesulphonamide, (3-amino-4-methyl-benzenesulphonyl)-o-toluenesulphonamide, (3-amino-4-methyl-benzenesulphonyl)-methanesulfphonamide, (3-amino-4-methoxy-benzenesulphonyl)-benzenesulphonamide, (3-amino-4-methoxy-benzenesulphonyl)-p-toluenesulphonamide, (3-amino-4-methoxy-benzenesulphonyl)-methanesulphonamide, (3-amino-4-methoxy-benzenesulphonyl)-butanesulphomide, (3-amino-6-methoxy-benzenesulphonyl)-benzenesulphonamide, (3-amino-6-methoxy-benzenesulphonyl)-p-toluenesulphonamide, (3-amino-6-methoxy-benzenesulphonyl)-methanesulphonamide, (3-amino-6-methoxy-benzenesulphonyl)-butanesulphonamide, (2-amino-benzenesulphonyl)-benzenesulphonamide, (2-amino-benzenesulphonyl)-p-toluenesulphonamide, (2-amino-benzenesulphonyl)-o-toluenesulphonamide, (2-amino-benzenesulphonyl)-methanesulphonamide, (2-amino-benzenesulphonyl)-butanesulphonamide, (3-amino-6-ethyl-benzenesulphonyl)-benzenesulphonamide, (3-amino-6-ethyl-benzenesulphonyl)-p-toluenesulphonamide, (3-amino-6-ethyl-benzenesulphonyl)-methanesulphonamide, (3-amino-4-ethyl-benzenesulphonyl)-benzenesulphonamide, (3-amino-6-ethoxy-benzenesulphonyl)-benzenesulphonamide, (3-amino-6-ethoxy-benzenesulphonyl)-p-toluenesulphonamide, (3-amino-6-chloro-benzenesulphonyl)-benzenesulphonamide, (3-amino-6-chloro-benzenesulphonyl)-p-toluenesulphonamide, (3-amino-6-chloro-benzenesulphonyl)-o-toluenesulphonamide, (4-amino-benzenesulphonyl)-p-toluenesulphonamide, (4-amino-benzenesulphonyl)-o-toluenesulphonamide, (4-amino-benzenesulphonyl)-methanesulphonamide, (4-amino-benzenesulphonyl)-butanesulphonamide, (3-amino-4-bromo-benzenesulphonyl)-benzenesulphonamide, (3-amino-4-bromo-benzenesulphonyl)-p-toluenesulphonamide, (3-amino-4-bromo-benzenesulphonyl)-o-toluenesulphonamide, (3-amino-4-bromo-benzenesulphonyl)-methanesulphonamide, (3-amino-4-bromo-benzenesulphonyl)-butanesulphonamide, (2-amino-3-chloro-4-methyl-benzenesulphonyl)-benzenesulphonamide, (2-amino-3-chloro-4-methyl-benzenesulphonyl)-benzenesulphonamide, (2-amino-3-chloro-4-methoxy-benzenesulphonyl)-benzenesulphonamide, (3-amino-4-chloro-5-methyl-benzenesulphonyl)-benzenesulphonamide, (3-amino-5-chloro-6-methyl-benzenesulphonyl)-benzenesulphonamide, (3-amino-5-chloro-6-methyl-benzenesulphonyl)-methanesulphonamide, (4-amino-5-chloro-benzenesulphonyl)-benzenesulphonamide, (4-amino-3-chloro-benzenesulphonyl)-methanesulphonamide, (4-amino-5-methyl-benzenesulphonyl)-methanesulphonamide, (4-amino-5-methyl-benzenesulphonyl)-benzenesulphonamide, (3-amino-benzenesulphonyl)-1-napthylsulphonamide, (4-amino-benzenesulphonyl)-2-naphthylsulphonamide, (3-amino-benzenesulphonyl)-N,N-dimethylaminosulphonamide, (4-amino-benzenesulphonyl)-N,N-diethylaminosulphonamide and (3-amino-benzenesulphonyl)-N,N-dibutylaminosulphonamide.

Examples of suitable middle components of the formula (X) are: aniline, 2-aminotoluene, 3-aminotoluene, 2-amino-ethylbenzene, 3amino-ethylbenzene, 3-chloroaniline, 3-bromoaniline, 2-aminoanisole, 3-aminoanisole, 2-amino-ethoxybenzene, 3-amino-ethoxybenzene, 1-amino-2,3-dimethylbenzene, 1-amino-2,5-dimethylbenzene, 1-amino-3,5-dimethylbenzene, 3-amino-4-methoxy-toluene, 2-amino-4-methoxy-toluene, 2-amino-1,4-dimethoxybenzene, 2-amino-4-ethoxy-toluene, 2-amino-1,4-diethoxybenzene, α-naphthylamine, 5,6,7,8-tetrahydro-napthylamine-(1) and their N-sulphonic acids or their N-ω-methanesulphonic acids.

As examples of suitable end components of the formula (XII) there may be mentioned: phenol, o-cresol, m-cresol, p-cresol, 1-hydroxy-4-ethylbenzene, 1-hydroxy-4-tertiary butylbenzene, 1-hydroxy-2-ethylbenzene, 1-hydroxy-2-isopropylbenzene, 1-hydroxy-2-secondary butylbenzene, 3-hydroxy-1,2-dimethylbenzene, 2-hydroxy-1,4-dimethylbenzene, 4-hydroxy-1,2-dimethylbenzene, 2-hydroxy-1,3-diethylbenzene, 1-hydroxy-2-methoxybenzene, 1-hydroxy-3-methoxybenzene, 1-hydroxy-3-ethoxybenzene, 1-hydroxy-4-butoxybenzene and 1-hydroxy-3-butoxybenzene.

As examples of suitable acylating agents there may be mentioned: benzenesulphonic acid chloride, o-, m- and p-chlorobenzenesulphonic acid chloride, 3,4-dichlorobenzenesulphonic acid chloride, 2,5-dichlorobenzenesulphonic acid chloride, o-, m- and p-toluenesulphonic acid chloride, o-, m- and p-nitrobenzenesulphonic acid chloride, 4-chloro-3-nitrobenzenesulphonic acid chloride, 2-chloro-5-nitrobenzenesulphonic acid chloride, 4-chloro-2-toluenesulphonic acid chloride, 2-chloro-4-toluenesulphonic acid chloride, 1,3-dimethyl-4-benzenesulphonic acid chloride, 1,2,3,4-tetrahydronaphthalene-6-sulphonic acid chloride, 1- and 2-naphthalenesulphonic acid chloride, o-, m- and p-methoxybenzenesulphonic acid chloride, o-, m- and p-ethoxybenzenesulphonic acid chloride and the corresponding arylsulphonic acid bromides.

The diazotisation of the amines of the formula (IX) is carried out according to methods which are themselves known, preferably in aqueous mineral acid solution, using sodium nitrite. The coupling of the diazonium compounds of the amines of the formula (IX) with the coupling components of the formula (X) can be effected according to processes which are in themselves known, for example in a neutral to strongly acid, but preferably in a weakly acid, pH range, in an aqueous or organic-aqueous medium.

The monoazo dyestuffs of the formula (XI) are isolated according to known methods, for example by filtration or by salting out with a salt which is soluble in aqueous solution, for example with NaCl or KCl, followed by filtration. If coupling components of the formula (X) with $Z = SO_3H$ or $—CH_2—SO_3H$ are employed, isolation of the monoazo dyestuffs is frequently only necessary after liberation of the amino group of the coupling component effected by alkaline or acid saponification. An intermediate isolation of the monoazo dyestuffs is however not always necessary — they can also be diazotised further without being isolated.

The further diazotisation of the aminoazo dyestuffs (XI) with $Z = H$ can be effected, for example, in an acid aqueous dispersion by means of sodium nitrite solution, and the diazotisation temperatures can be between 0° and 30°C. Aminoazo dyestuffs of the formula (XI) with $Z = H$ can furthermore also be diazotised indirectly by preparing an alkaline solution thereof, adding sodium nitrite solution and pouring the mixture into aqueous hydrochloric acid, or adding hydrochloric acid.

The coupling of the diazotised aminoazo dyestuffs (XI) with the end components (XII) to give the disazo dyestuffs (XIII) is also carried out in the usual manner, preferably in an aqueous-alkaline medium. The disazo dyestuffs of the formula (XIII) can be isolated by simply filtering them off, if necessary after addition of sodium chloride. If the dyestuffs are obtained in an impure form, they can be recrystallised in a known manner from hot water, if appropriate with addition of alkali.

The reaction of the disazo dyestuffs (XIII) with the arylsulphonic acid halides to give the dyestuffs (I) is effected in the usual manner, for example in an aqueous alkaline medium.

The more sparingly soluble dyestuffs (I) can be rendered readily water-soluble by mixing them with salts of strong bases and weak acids, for example trisodium phosphate, disodium hydrogen phosphate, sodium tetraborate, sodium metaphosphate, sodium metasilicate or sodium carbonate.

The new dyestuffs of the formula (I) can be isolated, or exist as, or be further used as, the free acid or as alkali metal salts or ammonium salts. Suitable alkali metal salts in which the hydrogen atom of the —NH group is thus replaced by an alkali metal cation, are, for example, the sodium salts, potassium salts or lithium salts.

The new dyestuffs are particularly suitable for dyeing and printing natural and synthetic fibre materials containing amide groups, for example fibre materials of wool, silk and polyamide, such as poly-$\epsilon$-caprolactum or the reaction product of hexamethylenediamine with adipic acid. The resulting dyeings, particularly on polyamide materials, are distinguished by good fastness properties. The dyestuffs of the formula (I) are employed for dyeing either in the form of the free acid (>NH) or as alkali metal salts or the ammonium salt.

In the examples which follow, parts denote parts by weight and percentages denote percentages by weight.

EXAMPLE 1:

31.2 parts of (3-amino-benzenesulphonyl)-benzenesulphonamide are dissolved in 200 parts of water with addition of 10% strength sodium hydroxide solution and 7.0 parts of sodium nitrite are added. The solution thus obtained is allowed to run into 200 parts of ice/$H_2O$ and 35 parts of concentrated hydrochloric acid and is diazotised in 0.5 hour at 0°–5°C; the excess of nitrous acid is then removed by means of amidosulphonic acid, the diazonium salt suspension is allowed to run into a solution of 20.5 parts of anilino-methanesulphonic acid and 9 parts of sodium bicarbonate in 100 parts of water at 0°–5°C and the pH is kept at between 5 and 7 by further addition of sodium bicarbonate. After completion of coupling, the product is salted out with sodium chloride, filtered off and washed with saturated sodium chloride solution. The moist dyestuff paste is stirred for 1 hour in 200 parts of 7% strength sodium hydroxide solution at 80°–90°C. After completion of the splitting off of the sulphomethyl group, the dyestuff is precipitated by adding sodium chloride, filtered off and washed with saturated sodium chloride solution.

The aminoazo dyestuff thus obtained is dissolved in 500 parts of water, 7.0 parts of sodium nitrite are added, the dyestuff is diazotised by pouring the mixture into 1,000 parts of water and 30 parts of concentrated hydrochloric acid at 10°–20°C over the course of 30 minutes, and the excess nitrous acid is then destroyed with amidosulphonic acid. The diazonium salt suspension thus obtained is stirred into a solution of 9.5 parts of phenol and 4 parts of sodium hydroxide in 200 parts of water at 10°–20°C and the pH is kept at between 8 and 9 by adding 10% strength sodium hydroxide solution. After completion of coupling, the disazo dyestuff is filtered off and dissolved in 500 ml of water at pH 10 by adding concentrated sodium hydroxide solution, and 18.6 g of benzenesulphonyl chloride are added dropwise at 80°. The pH value is kept at 10–10.5 by simultaneous dropwise addition of concentrated sodium hydroxide solution. The mixture is stirred for a further 30 minutes and the dyestuff which has precipitated is filtered off, washed with sodium chloride solution and dried in vacuo at 50°C. In the form of the free acid, the dyestuff corresponds to the formula

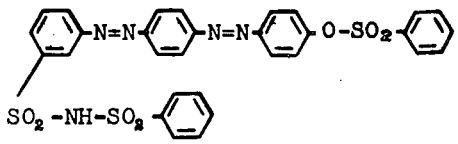

It dyes polyamide, from a weakly acid or neutral bath, in yellow shades of good fastness properties.

DYEING EXAMPLE 0.1 g of the dyestuff is dissolved in 100 ml of hot water, 5 ml of 10% strength ammonium acetate solution are added and the mixture is diluted to a volume of 500 ml with water. 10 g of polyamide fibres are introduced into the dye bath, the bath is brought to the boil over the course of 20 minutes, 4 ml of 10% strength acetic acid are added and the temperature is maintained at the boil for one hour. The fibre material is then rinsed and dried at 70°–80°C.

If the procedure indicated in the preceding example is followed and the starting components, middle components and end components indicated in the table which follows are used, with benzenesulphonic acid chloride as the acylating agent, further disazo dyestuffs of the general formula (I) are obtained, which dye polyamide in yellow to scarlet shades.

| Example | Starting component | Middle component | End component |
| --- | --- | --- | --- |
| 2 | (3-amino-benzenesulphonyl)-benzenesulphonamide | aniline | o-cresol |
| 3 | " | " | m-cresol |
| 4 | " | " | p-cresol |
| 5 | " | 3-amino-ethylbenzene | phenol |
| 6 | " | " | o-cresol |
| 7 | " | " | p-cresol |
| 8 | " | 3-amino-4-methoxy-toluene | phenol |
| 9 | " | " | o-cresol |
| 10 | " | " | 4-tert.-butylphenol |
| 11 | " | " | m-cresol |
| 12 | " | " | 3-methoxy-phenol |
| 13 | " | " | 3-ethoxy-phenol |
| 14 | " | " | 2-hydroxy-1,4-dimethylbenzene |
| 15 | " | " | 3-hydroxy-1,2-dimethylbenzene |
| 16 | " | " | p-cresol |
| 17 | " | 3-amino-anizole | phenol |
| 18 | " | " | o-cresol |
| 19 | " | " | p-cresol |
| 20 | (3-amino-benzenesulphonyl)-benzenesulphonamide | 3-amino-3-anisole | m-cresol |
| 21 | " | " | 4-tert.-butylphenol |
| 22 | " | " | 3-methoxy-phenol |
| 23 | " | " | 2-methoxy-phenol |
| 24 | " | " | 2-hydroxy-1,4-dimethylbenzene |
| 25 | " | 2-amino-toluene | phenol |
| 26 | " | " | o-cresol |
| 27 | " | " | p-cresol |
| 28 | " | " | 4-ethyl-phenol |
| 29 | " | " | 4-hydroxy-1,2-dimethylbenzene |
| 30 | " | " | 3-methoxy-phenyl |
| 31 | " | " | 2-isopropyl-phenol |
| 32 | " | " | 2-isopropyl-phenol |
| 33 | " | " | 2-hydroxy-1,3-diethylbenzene |
| 34 | " | 2-amino-1,4-dimethoxybenzene | phenol |
| 35 | " | " | o-cresol |
| 36 | " | " | p-cresol |
| 37 | " | " | 4-ethyl-phenol |
| 38 | (3-amino-benzenesulphonyl)-benzenesulphonamide | 2-amino-1,4-dimethoxybenzene | 4-hydroxy-1,2-dimethylbenzene |
| 39 | " | 1-amino-2,5-dimethylbenzene | phenol |
| 40 | " | " | m-cresol |
| 41 | " | " | 4-ethyl-phenol |
| 42 | " | " | 3-methoxy-phenol |
| 43 | " | " | 2-hydroxy-1,4-dimethyl-phenol |
| 44 | " | 2-amino-4-ethoxy-toluene | phenol |
| 45 | " | " | m-cresol |
| 46 | " | " | p-cresol |
| 47 | " | " | 3-ethoxy-phenol |
| 48 | " | " | 2-ethyl-phenol |
| 49 | " | aniline | 3-methoxy-phenol |
| 50 | " | " | 1-hydroxy-2-ethylbenzene |
| 51 | " | " | 2-hydroxy-1,3-dimethylbenzene |
| 52 | " | " | 2-hydroxy-1,4-dimethylbenzene |
| 53 | " | 3-amino-toluene | phenol |
| 54 | " | " | o-cresol |
| 55 | " | " | p-cresol |
| 56 | (3-amino-benzenesulphonyl)-benzenesulphonamide | 3-amino-toluene | 1-hydroxy-4-ethylbenzene |
| 57 | " | " | 1-hydroxy-3-ethoxybenzene |
| 58 | " | " | 4-hydroxy-1,2-dimethylbenzene |
| 59 | " | 2-amino-1,4-diethoxybenzene | phenol |
| 60 | " | " | 4-ethyl-phenol |
| 61 | " | " | 4-tert.-butylphenol |
| 62 | " | α-naphthylamine | p-cresol |
| 63 | " | " | o-cresol |
| 64 | " | " | phenol |

-continued

| Example | Starting component | Middle component | End component |
|---|---|---|---|
| 65 | " | " | 3-methoxy-phenol |
| 66 | " | " | 4-ethyl-phenol |
| 67 | " | " | 4-tert.-butylphenol |
| 68 | " | " | 2-hydroxy-1,4-dimethylbenzene |
| 69 | " | " | 2-hydroxy-1,3-diethylbenzene |
| 70 | " | 5,6,7,8-tetrahydro-naphthylamine-(1) | phenol |
| 71 | " | " | o-cresol |
| 72 | " | " | p-cresol |
| 73 | (3-amino-benzenesulphonyl)-benzenesulphonamide | 5,6,7,8-tetrahydro-naphthylamine-(1) | 4-ethyl-phenol |
| 74 | " | " | 3-methoxy-phenol |
| 75 | " | 3-amino-ethylbenzene | 4-hydroxy-1,2-dimethylbenzene |
| 76 | " | " | 3-methoxy-phenol |
| 77 | " | " | 4-tert.-butylphenol |
| 78 | " | 2-amino-ethylbenzene | phenol |
| 79 | " | " | p-cresol |
| 80 | " | " | o-cresol |
| 81 | " | " | 4-ethyl-phenol |
| 82 | " | 2-amino-anisole | phenol |
| 83 | " | " | o-cresol |
| 84 | " | " | p-cresol |
| 85 | " | " | 3-methoxy-phenol |
| 86 | " | " | 4-butoxy-phenol |
| 87 | " | " | 2-isopropyl-phenol |
| 88 | " | 3-bromo-aniline | phenol |
| 89 | " | " | m-cresol |
| 90 | " | " | 4-ethyl-phenol |
| 91 | (3-amino-benzenesulphonyl)-benzenesulphonamide | 3-amino-ethoxybenzene | phenol |
| 92 | " | " | o-cresol |
| 93 | " | " | 4-tert.-butylphenol |
| 94 | " | " | 3-methoxy-phenol |
| 95 | " | " | 2-methoxy-phenol |
| 96 | " | 3-chloro-aniline | phenol |
| 97 | " | " | p-cresol |
| 98 | " | " | 2-secondary butylphenol |
| 99 | " | " | 4-ethyl-phenol |
| 100 | " | 1-amino-2,3-dimethylbenzene | phenol |
| 101 | " | " | m-cresol |
| 102 | " | " | p-cresol |
| 103 | " | " | 4-ethyl-phenol |
| 104 | " | " | 3-hydroxy-1,2-dimethylbenzene |
| 105 | " | 2-amino-4-methoxy-toluene | phenol |
| 106 | " | " | o-cresol |
| 107 | " | " | 4-tert.-butylphenol |
| 108 | " | " | 3-methoxy-phenol |

| Example | Starting component | Middle component | End component | Acylating agent |
|---|---|---|---|---|
| 109 | (3-amino-benzenesulphonyl)-methanesulphonamide | 1-amino-2,3-dimethyl-benzene | o-cresol | o-toluenesulphonic acid chloride |
| 110 | (3-amino-benzenesulphonyl)-propanesulphonic acid amide | 2-amino-4-methoxy-toluene | phenol | p-toluenesulphonic acid chloride |
| 111 | (3-amino-benzenesulphonyl)-butanesulphonic acid amide | aniline | m-cresol | p-chlorobenzenesulphonic acid chloride |
| 112 | (3-amino-benzenesulphonyl)-p-toluenesulphonamide | 2-amino-ethylbenzene | 4-tert.-butylphenol | p-toluenesulphonic acid chloride |
| 113 | (3-amino-benzenesulphonyl)-o-toluenesulphonamide | 2-amino-1,4-diethoxy-benzene | 2-hydroxy-1,4-dimethylbenzene | benzenesulphonic acid chloride |
| 114 | (3-amino-4-chlorobenzene-sulphonyl)-p-toluene-sulphonic acid amide | 3-amino-ethoxybenzene | phenol | o-chlorobenzenesulphonic acid chloride |
| 115 | (3-amino-6-methylbenzene-sulphonyl)-benzene-sulphonamide | 1-amino-naphthalene | 3-methoxyphenol | p-toluenesulphonic acid chloride |
| 116 | (3-amino-6-methylbenzene-sulphonyl)-methane-sulphonic acid amide | 3-amino-toluene | phenol | benzenesulphonic acid chloride |
| 117 | (3-amino-4-methylbenzene-sulphonyl)-o-toluene-sulphonamide | " | m-cresol | o-toluenesulphonic acid chloride |
| 118 | (3-amino-4-methoxybenzene-sulphonyl)-benzene-sulphonamide | 2-amino-methoxybenzene | o-cresol | p-toluenesulphonic acid chloride |
| 119 | (3-amino-6-methoxybenzene-sulphonyl)-o-toluene-sulphonamide | 3-amino-ethoxybenzene | o-cresol | benzenesulphonic acid chloride |
| 120 | (2-amino-benzenesulphonyl)-benzenesulphonamide | " | p-cresol | o-toluenesulphonic acid chloride |
| 121 | (2-amino-benzenesulphonyl)-methanesulphonamide | 3-amino-methoxybenzene | phenol | " |
| 122 | (3-amino-6-ethylbenzene-sulphonyl)-p-toluene-sulphonamide | 3-amino-toluene | o-cresol | p-toluenesulphonic acid chloride |
| 123 | (3-amino-6-ethoxybenzene-sulphonyl)-benzene-phonamide | aniline | m-cresol | m-toluenesulphonic acid chloride |
| 124 | (3-amino-6-chlorobenzene-sulphonyl)-o-toluene-sulphonamide | 2-amino-4-methoxy-toluene | 4-hydroxy-1,2-dimethylbenzene | benzenesulphonic acid bromide |

-continued

| Example | Starting component | Middle component | End component | Acylating agent |
|---|---|---|---|---|
| 125 | (4-amino-benzenesulphonyl)-p-toluenesulphonamide | 2-amino-1,4-dimethoxybenzene | phenol | p-toluenesulphonic acid chloride |
| 126 | (4-amino-benzenesulphonyl)-o-toluenesulphonamide | 3-amino-toluene | 2-ethylphenol | o-toluenesulphonic acid chloride |
| 127 | (4-amino-benzenesulphonyl)-butanesulphonamide | " | phenol | benzenesulphonic acid chloride |
| 128 | (3-amino-4-bromobenzenesulphonyl)-benzenesulphonamide | 2-amino-methoxybenzene | o-cresol | " |
| 129 | (3-amino-4-bromobenzenesulphonyl)-methanesulphonamide | 3-amino-methoxybenzene | p-cresol | p-toluenesulphonic acid chloride |
| 130 | (2-amino-3-chloro-4-methyl-benzenesulphonyl)-benzenesulphonamide | " | m-cresol | benzenesulphonic acid chloride |
| 131 | (3-amino-4-chloro-5-methyl-benzenesulphonyl)-benzenephonamide | aniline | o-cresol | benzenesulphonic acid chloride |
| 132 | (3-amino-5-chloro-6-methyl-benzenesulphonyl)-methanesulphonamide | 3-amino-toluene | m-cresol | p-toluenesulphonic acid chloride |
| 133 | (4-amino-5-chlorobenzenesulphonyl)-benzenesulphonamide | aniline | 2-ethylphenol | " |
| 134 | (4-amino-5-methylbenzenesulphonyl)-methanesulphonamide | 3-amino-methoxybenzene | p-cresol | p-chlorobenzenesulphonic acid chloride |
| 135 | (3-amino-4-chlorobenzenesulphonyl)-6-toluenesulphonamide | aniline | m-cresol | p-toluenesulphonic acid chloride |
| 136 | (3-amino-4-chlorobenzenesulphonyl)-benzenesulphonamide | 3-amino-toluene | o-cresol | " |
| 137 | (3-amino-benzenesulphonyl)-1-naphthylsulphonamide | " | m-cresol | benzenesulphonic acid chloride |
| 138 | (3-amino-benzenesulphonyl)-2-naphthylsulphonamide | aniline | phenol | o-toluenesulphonic acid chloride |
| 139 | (3-amino-benzenesulphonyl)-N,N-dimethylaminosulphonamide | 3-amino-methoxybenzene | o-cresol | p-toluenesulphonic acid chloride |
| 140 | (3-amino-4-trifluoromethyl-benzenesulphonyl)-benzenesulphonamide | 2-amino-methoxybenzene | phenol | " |
| 141 | (3-amino-4-trifluoromethyl-benzenesulphonyl)-p-toluenesulphonamide | aniline | o-cresol | benzenesulphonic acid chloride |
| 142 | (4-amino-benzenesulphonyl)-benzenesulphonamide | " | o-cresol | benzenesulphonic acid chloride |
| 143 | (3-amino-benzenesulphonyl)-benzenesulphonamide | α-naphthylamine | p-cresol | p-toluenesulphonic acid chloride |
| 144 | (3-amino-benzenesulphonyl)-benzenesulphonamide | 2,5-dimethoxyaniline | phenol | " |
| 145 | (3-amino-4-chlorobenzenesulphonyl)-benzenesulphonamide | aniline | " | " |
| 146 | (3-amino-benzenesulphonyl)-benzenesulphonamide | α-naphthylamine | o-cresol | o-toluenesulphonic acid chloride |
| 147 | (3-amino-benzenesulphonyl)-benzenesulphonamide | " | phenol | p-chlorobenzenesulphonic acid chloride |

What is claimed is:

1. Disazo dyestuff which in the form of the free acid corresponds to the formula

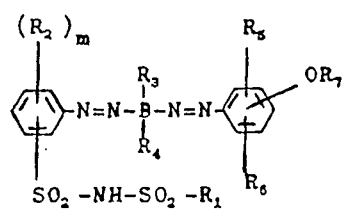

wherein

B is 1,4-phenylene, 5,6,7,8-tetrahydro-1,4-naphthylene or 1,4-naphthalene;

$R_1$ is phenyl, 1-naphthyl, 2-naphthyl, $C_1$–$C_4$-alkyl, di-$C_1$–$C_4$-alkylamino, or phenyl substituted by $C_1$–$C_4$-alkyl, $C_1$–$C_4$-alkoxy, halogen, cyano, or nitro;

$R_2$ is chlorine, bromine, $C_1$–$C_4$-alkoxy, $C_1$–$C_4$-alkyl, substituted $C_1$–$C_4$-alkoxy, or substituted $C_1$–$C_4$-alkyl wherein the substituent is halogen, cyano, hydroxyl or phenyl;

$R_3$ and $R_4$ are hydrogen, chlorine, bromine, $C_1$–$C_4$-alkyl, $C_1$–$C_4$-alkoxy, substituted $C_1$–$C_4$-alkyl, or substituted $C_1$–$C_4$-alkoxy wherein the substituent is halogen, cyano, hydroxyl or phenyl;

$R_5$ is hydrogen, chlorine, bromine, fluorine, phenyl, $C_1$–$C_4$-alkyl, or $C_1$–$C_4$-alkoxy;

$R_6$ is hydrogen, $C_1$–$C_4$-alkyl, or $C_1$–$C_4$-alkoxy;

$R_7$ is phenylsulphonyl, naphthylsulfonyl, tetrahydronaphthylsulfonyl or any of these three radicals further substituted on the carbocyclic nucleus by chlorine, bromine, methyl, ethyl, methoxy, or nitro; and $m$ is a number from 0 to 2.

2. Disazo dyestuff which in the form of the free acid corrresponds to the formula

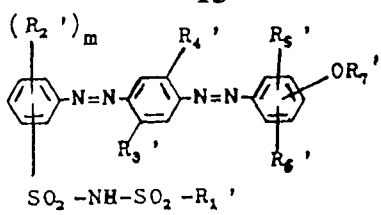

SO$_2$—NH—SO$_2$—R$_1$' wherein
- R$_1$' is phenyl, C$_1$–C$_4$-alkyl, or phenyl substituted by C$_1$–C$_4$-alkyl, C$_1$–C$_4$-alkoxy, halogen, cyano, or nitro;
- R$_2$' is chlorine, bromine, methoxy, ethoxy, methyl, or ethyl;
- R$_3$' is hydrogen, chlorine, methyl, methoxy, ethyl, or ethoxy;
- R$_4$' is hydrogen, methyl, methoxy, ethyl, or ethoxy;
- R$_5$' and R$_6$' independently of one another, are hydrogen, C$_1$–C$_4$-alkyl, C$_1$–C$_4$-alkoxy; and
- R$_7$' is phenylsulphonyl, o-, m- or p-tolylsulphonyl, or o-, m- or p-chlorophenylsulphonyl; and
- $m$ is a number from 0 to 2.

3. Disazo dyestuff which in the form of the free acid corresponds to the formula

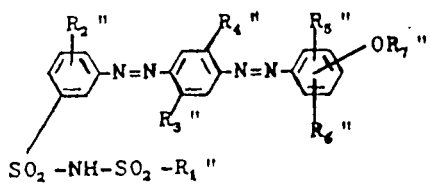

SO$_2$—NH—SO$_2$—R$_1$"

wherein
- R$_1$" is phenyl or tolyl;
- R$_2$" is hydrogen, chlorine, bromine, methoxy, ethoxy, methyl, or ethyl;
- R$_3$" is hydrogen, chlorine, methyl, methoxy, ethyl, or ethoxy;
- R$_4$" is hydrogen, methyl, methoxy, ethyl, or ethoxy;
- R$_5$" and R$_6$", independently of one another, are hydrogen, C$_1$–C$_4$-alkyl, or C$_1$–C$_4$-alkoxy; and
- R$_7$" is phenylsulphonyl or p-tolylsulphonyl.

4. Disazo dyestuff which in the form of the free acid corresponds to the formula

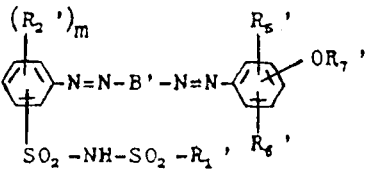

SO$_2$—NH—SO$_2$—R$_1$' wherein
- B' is 1,4-naphthylene, or 5,6,7,8-tetrahydro-1,4-naphthylene;
- R$_1$' is phenyl, C$_1$–C$_4$-alkyl, or phenyl substituted by C$_1$–C$_4$-alkyl, C$_1$–C$_4$-alkoxy, halogen, cyano, or nitro;
- R$_2$' is hydrogen, chlorine, bromine, methoxy, ethoxy, methyl, or ethyl;
- R$_5$' and R$_6$' independently of one another, are hydrogen, C$_1$–C$_4$-alkyl or C$_1$–C$_4$-alkoxy;
- R$_7$' is phenylsulphonyl, o-, m- or p-tolylsulphonyl, or o-, m- or p-chlorophenylsulphonyl; and
- $m$ is a number from 0 to 2.

5. Disazo dyestuff which in the form of the free acid corresponds to the formula

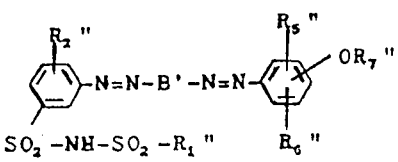

SO$_2$—NH—SO$_2$—R$_1$"

wherein
- B' is 1,4-naphthylene or a 5,6,7,8-tetrahydro-1,4-naphthylene;
- R$_1$" is phenyl or tolyl;
- R$_2$" is hydrogen, chlorine, bromine, methoxy, ethoxy, methyl, or ethyl;
- R$_5$" and R$_6$" independently of one another, are hydrogen, C$_1$–C$_4$-alkyl or C$_1$–C$_4$-alkoxy group; and
- R$_7$" is phenylsulphonyl or p-tolylsulphonyl.

* * * * *